Dec. 30, 1924.

L. B. SPERRY

GYROSCOPIC APPARATUS FOR AIRPLANES 1,521,132

Filed Nov. 25, 1921  2 Sheets-Sheet 1

Inventor
LAWRENCE B. SPERRY
By his Attorney
Herbert H. Thompson

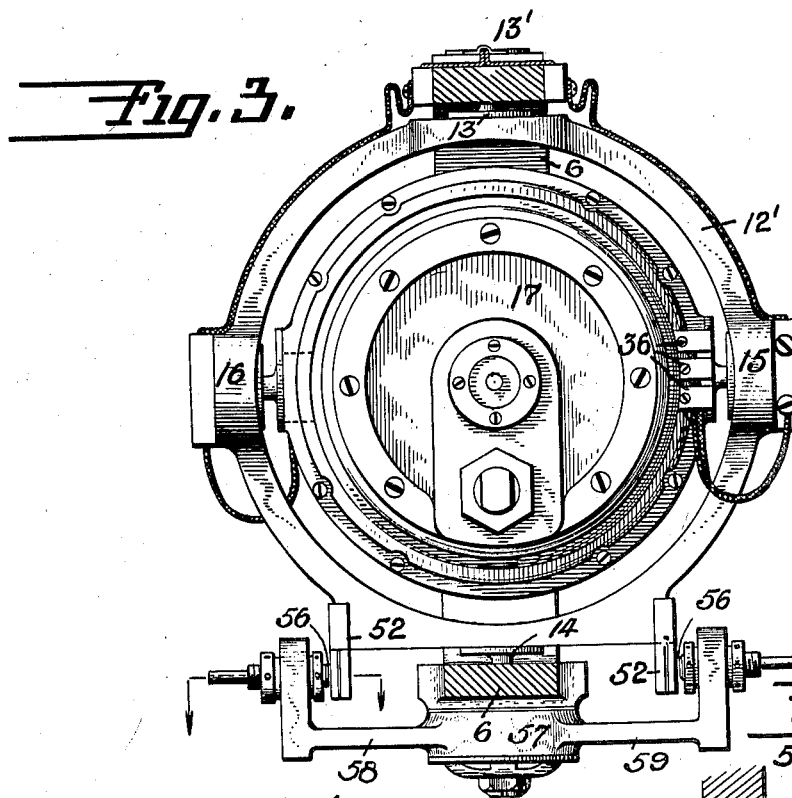
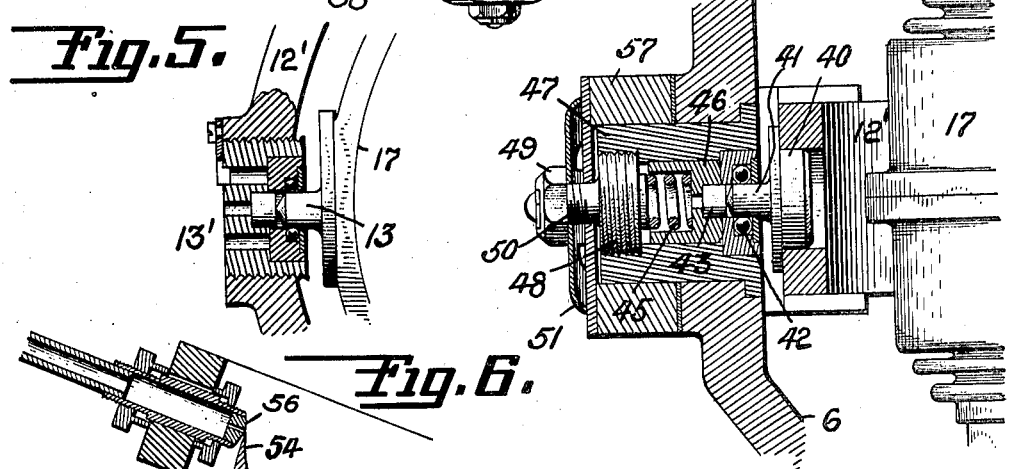
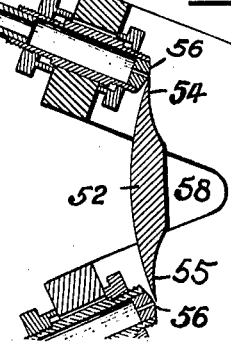

Patented Dec. 30, 1924.

1,521,132

UNITED STATES PATENT OFFICE.

LAWRENCE B. SPERRY, OF FARMINGDALE, NEW YORK, ASSIGNOR TO THE SPERRY GYROSCOPE COMPANY, OF BROOKLYN, NEW YORK, A CORPORATION OF NEW YORK.

GYROSCOPIC APPARATUS FOR AIRPLANES.

Application filed November 25, 1921. Serial No. 517,482.

*To all whom it may concern:*

Be it known that I, LAWRENCE B. SPERRY, a citizen of the United States of America, residing at Farmingdale, L. I., in the county of Nassau and State of New York, have invented certain new and useful Improvements in Gyroscopic Apparatus for Airplanes, of which the following is a specification.

This invention relates to gyroscopic apparatus especially designed for use on airplanes. More particularly, it relates to the so called azimuth or steering gyroscope, used for airplanes and aerial torpedoes, this invention being an improvement upon the type of steering gyroscope shown in my copending application for gyroscopic pilots for airplanes, Serial No. 112,505, filed August 1st, 1916. Such a gyroscope is designed to possess three degrees of freedom, so as to stand still in space for a sufficient period of time requisite for a given flight or observation, or indefinitely, as input torque balances the precession of the gyroscope.

The principal purpose of the invention is to improve the mounting of such gyroscopes, so that it will not be affected by the vibrations and jolts received on the airplane, since it is found that all such vibrations give rise to deviations of the gyroscope and also are destructive to gimbal bearings.

A further object of the invention is to improve the method of leading in the driving current to the gyro rotor. A still further object of the invention is to improve the method of effecting the control of the airplane from the gyroscopic apparatus, in other words, the transmission system, to make it of the required delicacy.

Referring to the drawings in which what I now consider to be the preferred form of my invention is shown;

Fig. 3 is a vertical section taken approximately on line 3—3 of Fig. 1 and looking in the direction of the arrow, the vertical ring and gyro case however, not being shown in section.

Fig. 4 is a detailed section of the lower thrust bearing or support of the gyroscope for turning about a vertical axis.

Fig. 5 is a sectional detail of one of the other bearings.

Fig. 6 is a detailed section of the air transmitter as it is connected to the gyroscope.

Figure 1:
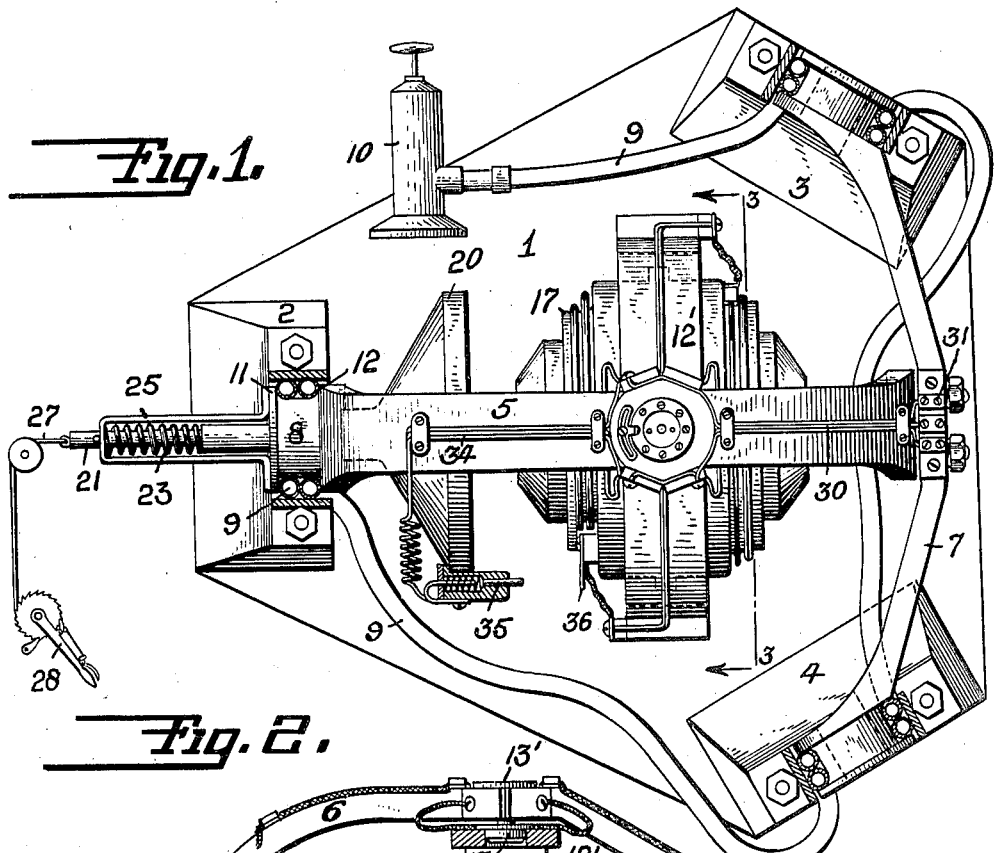
Fig. 1 is a plan view of an azimuth gyroscope constructed according to my invention.

As stated above, by repeated trials, it was found that the azimuth gyroscopes on airplanes and aerial torpedoes were not giving as accurate results as when the gyroscopes were run in the laboratory, or even on under-water torpedoes. After many experiments I determined that the principal cause of the trouble was the continuous jarring of the gyroscope in its bearings, by the jarring of the airplane engine and propellers and the shocks in landing, etc. Another cause I found to be the torque exerted about the axes of oscillation of the gyroscope by the wires leading in the current for driving the rotor. I have therefore provided a special auxiliary mounting for the gyroscope which eliminates such sudden jars, so that they never reach the sensitive mounting and bearings of the gyroscope. For this purpose, I have shown mounted on base 1 a plurality of supporting members, 2, 3 and 4, preferably 3 in number, which support in a three point support, a framework 5, within which the gyroscope itself is mounted. Said framework 5 is shown as comprising a normally vertical loop shaped member 6 supported at one end in a bracket 2 and supported, or otherwise secured at its opposite end to a transverse bar 7, forming the other portion of member 5. Said bar is mounted at opposite ends in supports 3 and 4. Preferably, at each point of support, member 5 is provided with a cylindrical bearing surface 8, and between said surface and each supporting member 2, 3 or 4, is placed what I term an air cushion, to absorb or deaden all shocks. Said cushion is shown as in the form of a rubber tubing 9 which is coiled around first one journal and then another, one or more times. A pump 10 is shown for inflating the tubing to any desired pressure. It will be noted that the tubing is interposed between the journal 8 and its support at all points, so that there is no point at which a shock may be transmitted, the tubing fitting snugly between the opposite shoulders 11 and 12 at opposite ends of the reduced cylindrical portion 8, (Fig. 1).

The gyroscope is supported within said member 5 for freedom about the three principal axes. For this purpose, I have shown a vertical ring 12' supported for rotation about a vertical axis within member 5, upon upper and lower bearings 13 and 14, while the gyro casing or bearing frame in turn is supported for oscillation about a horizontal axis within the vertical ring by bearings 15 and 16. It will be understood that the rotor proper is mounted within the casing 17 on a normally horizontal axis 19, 20 and at right angles to the axes 15 and 16, and is suitably driven by an electric motor within the case, such for instance, as shown by previous application hereinbefore referred to. Preferably, three phase alternating current is used for driving the rotor.

When the gyroscope is not in use, it is found desirable to lock the same against oscillation, in its gimbal rings. It is also desirable to provide means for centralizing the same with respect to the aircraft, in case it should wander, so as to get out of control.

Figure 2:
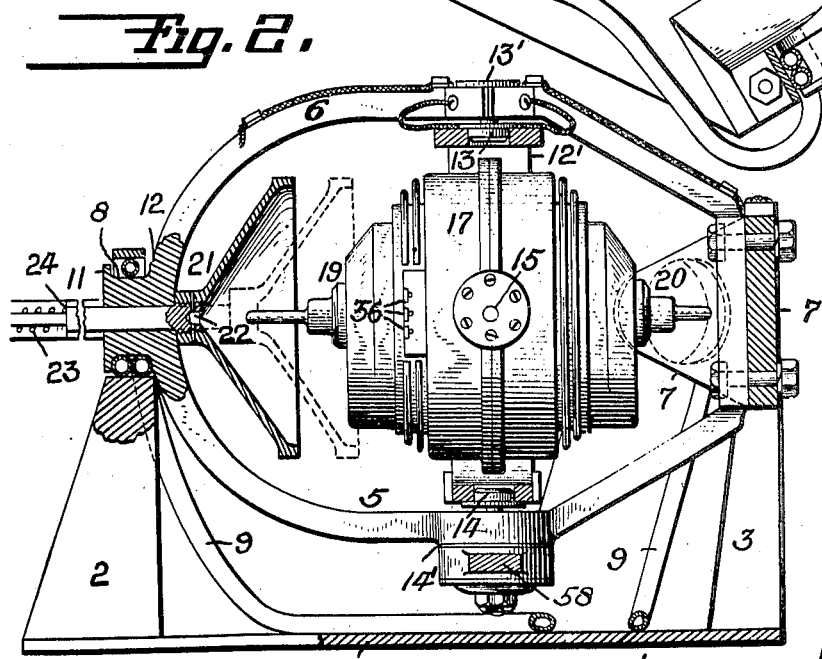
Fig. 2 is a side view of the same, partly in section.

For the above purposes, I have shown a hollow conical shaped member 20, having a rearwardly reduced extension 21, extending through and slidably mounted in a hollow trunnion 8, so that said member 20 may be movable to the right in Figs. 1 and 2, so as to firmly abut against the gyro casing, and lock it from oscillation about either axis. When so locked, the central extension 21 on axis 19, 20 of the gyroscope enters the central aperture 22 of member 20, (see dotted line position in Fig. 2). Member 20 is normally thrust inwardly by a compression spring 23 abutting between the shoulder 24 on the extension 21 and a U shaped bracket 25, secured to trunnion 8. Manual or other means may be provided for retracting the centralizing member. Preferably, such means are operable from the driver's seat. For this purpose, I have shown a wire or a cord 27 secured to stem 21 and running to a ratchet lever 28, which may be mounted near the pilot.

When used on an aerial torpedo, it will be understood that the gyroscope is maintained locked until it is up to speed and until the torpedo is launched, when the gyroscope may be unlocked automatically, if desired, as a part of the launching operation.

In addition to freeing the gyroscope from all shocks, it is also highly important that there be no torques about any of the axes of oscillation, as pointed out above. It is however necessary that means be provided for leading in the driving current to the motor driven rotor. For this purpose I have shown flexible wires 30 leading from binding posts 31 on transverse bar 7, up along the member 5 where the wires divide and are looped around the pivot 13' to the vertical ring 12', on both sides of the pivot. Extremely fine silk covered wire is provided, having as little stiffness as possible. The wires lead down both sides of the vertical ring symmetrically, to a point at or near the horizontal axis 15, 16 of the gyro casing. At this point, the wires are again looped around the pivots to the gyro casing, where they are attached to binding posts leading within the casing to the gyro motor. In order that the wires may be as fine as possible, I prefer to employ wires of only sufficient carrying capacity to carry the normal current used for driving the gyro when up to speed without overheating. I therefore provide auxiliary means for supplying an additional conductor connected directly to the gyro casing when the gyroscope is being accelerated. For this purpose I have indicated that wires 30 extend beyond the vertical axis 13, 14 as indicated at 34, and extend over to spring pressed contact fingers 35, mounted on the slidable member 20. Said contact fingers are adapted to contact with contacts 36 on the gyro casing and thus lead current directly to the gyro casing as long as the member 20 is in the closed position. The member 20 is normally kept in such position until the gyroscope is up to speed and until the machine is launched, since the gyroscope is not at its best efficiency until the normal speed has been achieved.

In addition to providing means for preventing shocks from reaching the sensitive gyro bearings, I have shown a special thrust bearing 14' for supporting the weight of the gyroscope about the vertical axis. As shown, the vertical ring 12' is secured at its lower end to a bearing member 40, having a stud 41, which in turn is journalled in the radial ball bearing 42. The thrust and end play is taken up by a hardened block 43, normally held in engagement with the tapered end of the stem 41 by the compression spring 45. Said spring supports member 46 slidably mounted within the bushing 47 and directly supporting the block 43. Adjustment of the spring is provided by the set screw 48 which may be locked in place by a nut 49 threaded on reduced extension 50 and locking spring washer 51. The entire weight of the gyro is thus resiliently supported within as well as without the frame 5.

Frictionless means are also used to transmit the position of the gyroscope to a distance for effecting the control of the airplane, or for making an indication, or the like. For this purpose, I have provided the vertical ring 12 with one or more curved segments 52, which are shown as suspended below the vertical ring. Said segments are carefully machined, their ends being sharpened to knife edges 54, 55. Immediately adjacent the said segment is mounted an air intake nozzle 56, connected with any suitable means for creating negative or positive air pressure. As a similar nozzle is provided either for the other knife edge 55 or for the knife edges on the other member 53, or both, it may readily be seen that as either nozzle is uncovered by the adjacent knife edge, air will flow through at a greater rate than through the other nozzle, since as one nozzle is uncovered, the other will be further covered. This variation in air pressure may be made use of in any suitable manner through relays or otherwise, to actuate an indicator or the vertical rudder of the airplane for automatically steering the craft on the desired course. Said nozzles are shown as mounted on an adjustable bracket 57 having arms 58 and 59 in which the nozzle members are adjustably mounted. Said bracket 57 is journalled on bushing 47 and may be clamped in any desired position by washer 51 and nut 49 hereinbefore described.

In accordance with the provisions of the patent statutes, I have herein described the principle of operation of my invention, together with the apparatus, which I now consider to represent the best embodiment thereof, but I desire to have it understood that the apparatus shown is only illustrative and that the inventions can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. A mounting for gyroscopic apparatus comprising a support, a frame within which the gyroscope is mounted in said support at three spaced points and an air cushion between said support and frame at said points.

2. A mounting for gyroscopic apparatus comprising a supporting member, a frame member within which the gyroscope is mounted, a journal on one of said members journalled in the other of said members, and an air cushion between said journal and the said other member at a plurality of points.

3. A mounting for gyroscopic apparatus comprising a supporting member, a frame member within which the gyroscope is mounted, three journals on one of said members journalled in the other of said members and an air cushion between each of said journals and said other member.

4. In combination with a dirigible vehicle, of a gyroscope mounted thereon, means for automatically controlling the vehicle from said gyroscope, and only pneumatic connections between said gyroscope and said means and said vehicle.

5. In a gyroscopic steering device for dirigible vehicles, a gyroscope, a vertical ring within which said gyroscope is pivoted, a frame in which said ring is mounted for turning about a vertical axis, and a pneumatic cushion between each point where said frame is supported on the vehicle.

6. A mounting for gyroscopic apparatus comprising a supporting member, a frame within which the gyroscope is mounted, and an inflated tube between the points where the frame rests on the supporting member.

7. In a gyroscopic steering device for dirigible vehicles, a gyroscope, a vertical ring within which said gyroscope is pivoted, a frame in which said ring is mounted for turning about a vertical axis, a pneumatic cushion between each point where said frame is supported on the vehicle, and non-contacting air actuated means for controlling the vehicle from said gyroscope.

8. In an apparatus of the type described, a gyroscope, a ring within which said gyroscope is pivoted, a frame in which said ring is rotatably mounted, a support for said frame, a pneumatic cushion between said frame and said support at each point of support, and a yielding bearing for said ring in said frame.

In testimony whereof I have affixed my signature.

LAWRENCE B. SPERRY.